(12) United States Patent
Fan et al.

(10) Patent No.: US 11,995,035 B2
(45) Date of Patent: May 28, 2024

(54) SECURE PIPELINE-BASED DATA DELIVERY

(71) Applicant: AT&T Intellectual Property I, L.P., Atlanta, GA (US)

(72) Inventors: James Fan, San Ramon, CA (US); Steven Polston, Flemington, NJ (US); Sanjay Agraharam, Marlboro, NJ (US); Michelle Martens, Freehold, NJ (US); Arun Gupta, Manalapan, NJ (US)

(73) Assignee: AT&T Intellect al P Property I, L.P., Atlanta, GA (US)

( * ) Notice: Subject to any disclaimer, the term of this patent is extended or adjusted under 35 U.S.C. 154(b) by 661 days.

(21) Appl. No.: 17/219,848

(22) Filed: Mar. 31, 2021

(65) Prior Publication Data

US 2022/0329594 A1 Oct. 13, 2022

(51) Int. Cl.
*H04L 9/40* (2022.01)
*G06F 16/13* (2019.01)
(Continued)

(52) U.S. Cl.
CPC ............. *G06F 16/13* (2019.01); *H04L 63/10* (2013.01); *H04L 67/60* (2022.05)

(58) Field of Classification Search
CPC ....... H04L 63/102; H04L 63/10; H04L 67/60; H04L 63/0227; H04L 5/0023; H04L 5/0057; G06F 16/13; G06F 9/5083; G06F 16/254; G06F 11/3409; G06F 2209/5022; H04B 7/0626; H04W 4/029; H04W 24/08
See application file for complete search history.

(56) References Cited

U.S. PATENT DOCUMENTS

2013/0227573 A1* 8/2013 Morsi ................... G06F 9/5083
718/100
2018/0024901 A1* 1/2018 Tankersley ....... G06Q 10/06393
707/694

(Continued)

OTHER PUBLICATIONS

Heller, "Query Your Network Like a Database to Gain Knowledge and Simplify Operations", in Blog Engineering Network Product, Jan. 23, 2019, 15 pages.
Bandara, et al., "An Ontological Framework for Semantic Description of Devices", (2004), Computer Science, 2 pages.
Dibowski, et al., "Ontology-Based Device Descriptions and Device Repository for Building Automation Devices", EURASIP Journal on Embedded Systems, vol. 2011, Article ID 623461, 17 pages.

(Continued)

*Primary Examiner* — Chris Parry
*Assistant Examiner* — Hassan A Khan

(57) ABSTRACT

An example method includes receiving a plurality of data request specifications from a plurality of user endpoint devices of requesting users, aggregating a subset of the plurality of data request specifications which share a similarity into a super request, retrieving a plurality of datasets, wherein the plurality of datasets is needed to fulfill the super request, aggregating the plurality of datasets into a single data superset, and delivering the single data superset to the plurality of user endpoint devices of the requesting users via a data pipeline, where the delivering includes segregating the single data superset so that each user endpoint device of the plurality of user endpoint devices of the requesting users receives a portion of the single data superset corresponding to one data request specification of the plurality of data request specifications that was submitted by the each user endpoint device.

20 Claims, 5 Drawing Sheets

(51) Int. Cl.
  *H04L 67/60* (2022.01)
  *G06F 9/50* (2006.01)
  *G06F 11/34* (2006.01)
  *G06F 16/25* (2019.01)
  *H04B 7/06* (2006.01)
  *H04L 5/00* (2006.01)

(56) References Cited

U.S. PATENT DOCUMENTS

| | | | |
|---|---|---|---|
| 2020/0344576 A1* | 10/2020 | Li | H04L 12/185 |
| 2021/0097189 A1* | 4/2021 | Miller | G06F 21/53 |
| 2022/0141647 A1* | 5/2022 | Castellanos Zamora | H04W 8/186 455/418 |

OTHER PUBLICATIONS

Jarvenpaa, et al., "The development of an ontology for describing the capabilities of manufacturing resources", Journal of Intelligent Manufacturing, Jun. 15, 2018, pp. 959-978, https://dol.org/10.1007/s10845-018-14276.

Rodriguez et al., "Automating the deployment of 5G Network Slices with ONAP", Orange Labs, Jul. 4, 2019, 8 pages, arXiv:1907.02278v1 [cs.NI].

Oasis, "TOSCA Simple Profile for Network Functions Virtualization (NFV) Version 1.0", Committee Specification Draft 03, Mar. 17, 2016, 51 pages, https://docs.oasis-tosca-open.org/tosca/tosca-nfv/vl.0/csd03/tosca-nfv-v10-csd03.pdf.

U.S. Appl. No. 16/831,999, filed Mar. 27, 2020, entitled, "Data Pipeline Controller", not yet published, consists of 45 pages.

* cited by examiner

SECURE PIPELINE-BASED DATA DELIVERY

The present disclosure relates generally to data management, and relates more particularly to devices, non-transitory computer-readable media, and methods for enforcing security protocols during data exchanges conducted via a data pipeline.

BACKGROUND

A data pipeline is a set of data processing elements connected in series, e.g., such that the output of one data processing element serves as the input to the next data processing element. Data pipeline functionality is currently considered as a set of functions which are connected and operate with each other, but which generally lack additional intelligence which could facilitate automatically using the functions together in a variety of ways (which could cover many disparate use cases that would utilize the functions in a variety of different ways).

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
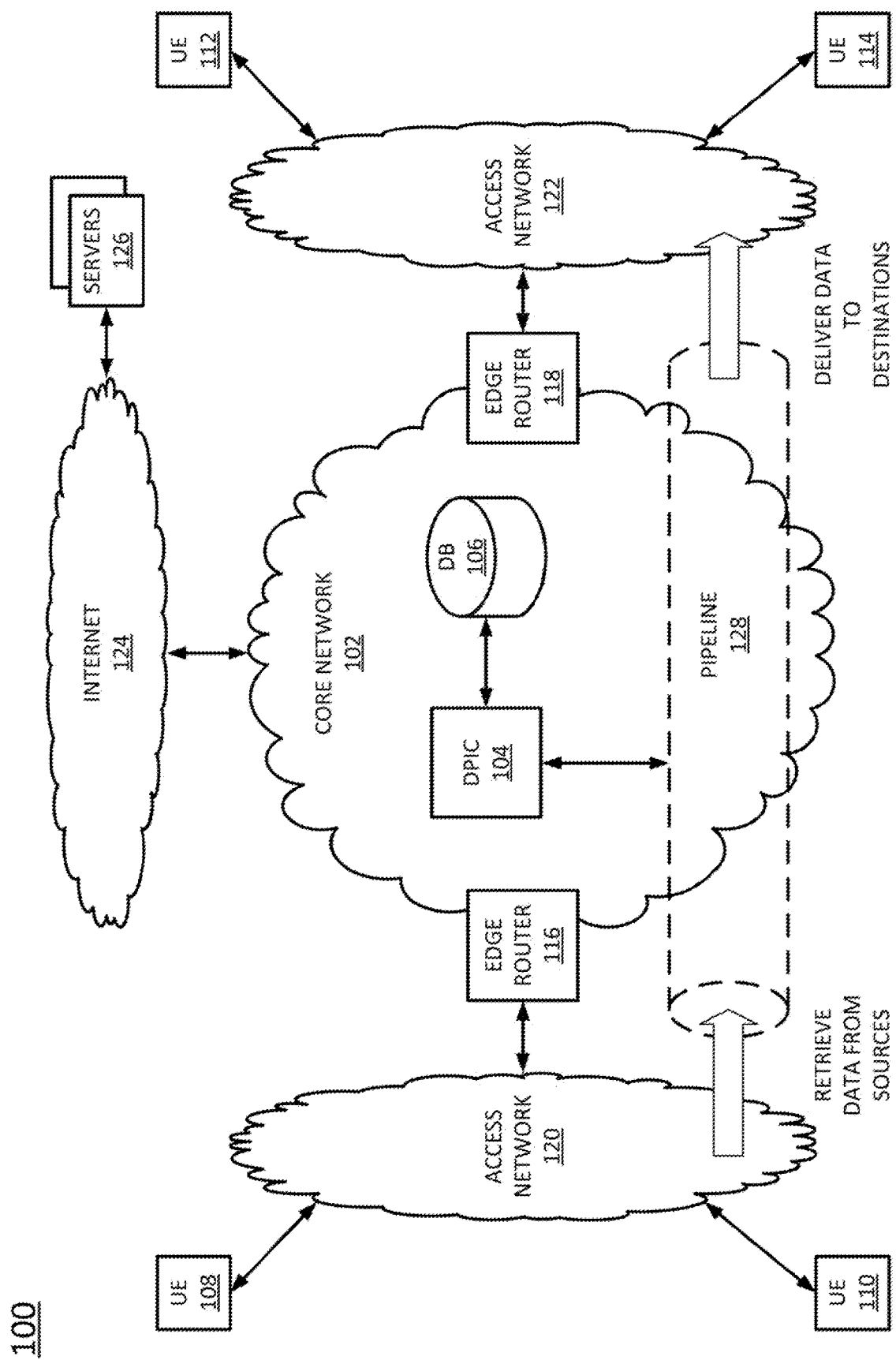
FIG. 1 illustrates an example system in which examples of the present disclosure for secure pipeline-based data exchange may operate.

The present disclosure broadly discloses methods, computer-readable media, and systems for secure pipeline-based data delivery. In one example, a method performed by a processing system includes receiving a plurality of data request specifications from a plurality of user endpoint devices of requesting users, aggregating a subset of the plurality of data request specifications which share a similarity into a super request, retrieving a plurality of datasets, wherein the plurality of datasets is needed to fulfill the super request, aggregating the plurality of datasets into a single data superset, and delivering the single data superset to the plurality of user endpoint devices of the requesting users via a data pipeline, where the delivering includes segregating the single data superset so that each user endpoint device of the plurality of user endpoint devices of the requesting users receives a portion of the single data superset corresponding to one data request specification of the plurality of data request specifications that was submitted by the each user endpoint device.

In another example, a non-transitory computer-readable medium may store instructions which, when executed by a processing system in a communications network, cause the processing system to perform operations. The operations may include receiving a plurality of data request specifications from a plurality of user endpoint devices of requesting users, aggregating a subset of the plurality of data request specifications which share a similarity into a super request, retrieving a plurality of datasets, wherein the plurality of datasets is needed to fulfill the super request, aggregating the plurality of datasets into a single data superset, and delivering the single data superset to the plurality of user endpoint devices of the requesting users via a data pipeline, where the delivering includes segregating the single data superset so that each user endpoint device of the plurality of user endpoint devices of the requesting users receives a portion of the single data superset corresponding to one data request specification of the plurality of data request specifications that was submitted by the each user endpoint device.

In another example, a device may include a processing system including at least one processor and non-transitory computer-readable medium storing instructions which, when executed by the processing system when deployed in a communications network, cause the processing system to perform operations. The operations may include receiving a plurality of data request specifications from a plurality of user endpoint devices of requesting users, aggregating a subset of the plurality of data request specifications which share a similarity into a super request, retrieving a plurality of datasets, wherein the plurality of datasets is needed to fulfill the super request, aggregating the plurality of datasets into a single data superset, and delivering the single data superset to the plurality of user endpoint devices of the requesting users via a data pipeline, where the delivering includes segregating the single data superset so that each user endpoint device of the plurality of user endpoint devices of the requesting users receives a portion of the single data superset corresponding to one data request specification of the plurality of data request specifications that was submitted by the each user endpoint device.

As discussed above, data pipeline functionality is currently considered as a set of functions which are connected and operate with each other, but which generally lack additional intelligence which could facilitate automatically using the functions together in a variety of ways (which could cover many disparate use cases that would utilize the functions in a variety of different ways).

An intelligent pipeline controller has previously been disclosed which automatically integrates and directs all pipeline functions as one flexible and highly-intelligent entity. This previously disclosed pipeline controller includes three high level subsystems: support modules, management and assembly modules, and request fulfillment modules. The support modules may discover underlying data pipeline capabilities, including modules, technologies, collectors, filters, and the like. The management and assembly modules may read ontologies and use newly discovered data pipeline information to refine an information model in real-time (where the information model may contain insights into how an existing pipeline structure can be enhanced or how a new pipeline structure can be established). The request fulfillment modules may fulfill user data requests (in a manner that hides the details of the execution of the fulfillment from the users). Request fulfillment modules may use the information models to respond to each data request that is received by the pipeline controller from a requesting user.

The previously disclosed pipeline controller allows for new pipeline functionality (e.g., at a higher level of abstraction) to be constructed dynamically as needed, such that even very complex and demanding user requests can be fulfilled, without the need for manual actions or human expertise at (or associated with) the various pipeline functions. Examples of the disclosed pipeline controller place particular focus on security on each delivered dataset per request. Efficiency is achieved through data compression principles, while security is achieved through data encryption and strict access rights enforcement.

However, as the volume of data traffic grows, there is an increasing need to further improve the efficiency of existing data delivery processes while maintaining any security requirements to be applied to the data. For instance, when multiple users request access to the same or similar datasets, each request may result in an increase in network traffic as the requested dataset(s) are duplicated and delivered to each of the requesting users. Although the previously disclosed pipeline controller addresses the need for maintaining data security, the previously disclosed pipeline controller does not include a mechanism to efficiently and securely deliver requested data in a manner that reduces the duplicated data traffic traversing through a corporate network. In addition, existing solutions do not adequately ensure that minimal requirements are met within a configurable tuning of tradeoffs between spatial, temporal, throughput, latency, and cost variables which may constrain inclusion or exclusion of candidate data requests into a superset (e.g., an aggregation of multiple data requests).

Examples of the present disclosure provide a mechanism by which an intelligent controller for a data pipeline may dynamically add or drop similar data requests in a single superset framework. Further examples allow the intelligent controller to waive unnecessary authorizations which could block valid data requests. In one example, the disclosure builds upon the previously disclosed data pipeline controller subsystems to implement this new functionality.

For instance, the support modules of the previously disclosed pipeline controller may be modified to include a plurality of security filters, including at least one of: an active requestor profile proxy (ARPP), an active per-data owner security filter (ADOSF), a dynamic per-request security filter (DRSF); a dynamic segregation filter (DSF), and a dynamic viewer filter (DVF).

The management and assembly modules of the previously disclosed pipeline controller may invoke a smart authorization integrator during the formation of information models, where the smart authorization integrator may analyze the security specifications of all of the data owners and may create the active per-data owner security filters (ADOSFs). The ADOSFs may be used during runtime to determine how to create a dataset without violating data owner security specifications. The data owner security specifications may specify the manners in which datasets owned by a corresponding data owner may be used (or may not be used), other users who may (or may not) use the datasets owned by the corresponding data owner, and other restrictions on the use of the datasets owned by the corresponding data owner. The management and assembly modules may also create the active requestor profile proxy (ARPP) to evaluate each potential data requestor's authorization rights. For instance, the ARPP for a potential data requestor may specify the potential data requestor's role or department within an enterprise, projects on which the potential data requestor is working, and the like.

During runtime, the request fulfillment modules of the previously disclosed pipeline controller may work with the smart authorization integrator, which may leverage the active requestor profile proxy (ARPP) information to create the dynamic per-request security filters (DRSFs). The ADOSFs and DRSFs may help the request fulfillment modules to find the best way to create a dataset and to bypass unnecessary access rules for the data requestor.

The request fulfillment modules may also work with a pipeline aggregator and segregator, which creates the dynamic segregation filters, to determine a subset of a dataset in a super data pipeline to deliver via an intermediate node in the data pipeline. Thus, examples of the present disclosure may optimize the use of network resources used to transport data by transporting a single aggregated dataset and then segmenting the single dataset for use by many users at scale. Although this approach may be more computationally complex than creating a separate stream to satisfy each request for data, the reduction in network traffic (due to the minimization of duplicated datasets) provides advantages that outweigh the additional complexity. An additional benefit is the reduction in data synchronization needs to address duplicated datasets across the corporate communication networks.

The request fulfillment modules may also work with a real-time differentiated viewer, which creates the dynamic viewer filters, to ensure secured viewing right for each requested dataset. These and other aspects of the present disclosure are discussed in greater detail below in connection with the examples of FIGS. 1-5.

To further aid in understanding the present disclosure, FIG. 1 illustrates an example system 100 in which examples of the present disclosure for secure pipeline-based data delivery may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one a data pipeline intelligent controller (DPIC) 104, at least one database (DB) 106, and a plurality of edge routers 116-118. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, 3rd party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the DPIC 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an Internet of Things (IoT) device, a wearable smart device (e.g., a smart watch, a fitness tracker, a head mounted display, or Internet-connected glasses), an application server, a bank or cluster of such devices, and the like. To this end, the user endpoint devices 108, 110, 112, and 114 may comprise one or more physical devices, e.g., one or more computing systems or servers, such as computing system 500 depicted in FIG. 5, and may be configured as described below.

In one example, at least one of the user endpoint devices 108, 110, 112, and 114 is operated by a data provider (or providing user). The data provider may be an individual who creates, owns, or otherwise has control over a dataset that is made available for sharing through the system 100. A data provider may specify one or more restrictions that control the manner in which other users of the system 100 may access the data provider's dataset(s). In a further example, at least one of the user endpoint devices 108, 110, 112, and 114 is operated by a data requestor (or requesting user). The data requestor may be an individual who requires access to a dataset that is made available for sharing through the system 100.

In one example, one or more servers 126 may be accessible to user endpoint devices 108, 110, 112, and 114 via the Internet 124 in general. The server(s) 126 may operate in a manner similar to the DPIC 104, which is described in further detail below.

In accordance with the present disclosure, the DPIC 104 and DB 106 may be configured to provide one or more operations or functions in connection with examples of the present disclosure for secure pipeline-based data delivery, as described herein. For instance, the DPIC 104 may be configured to operate in conjunction with a Web portal or interface via which a user may provide or request access to a dataset. A user endpoint device, such as any of the UEs 108, 110, 112, and/or 114 (e.g., wireless devices), may access a service on the DPIC 104 that enables access to datasets in a manner that enforces any security constraints put in place on the datasets.

Figure 5:
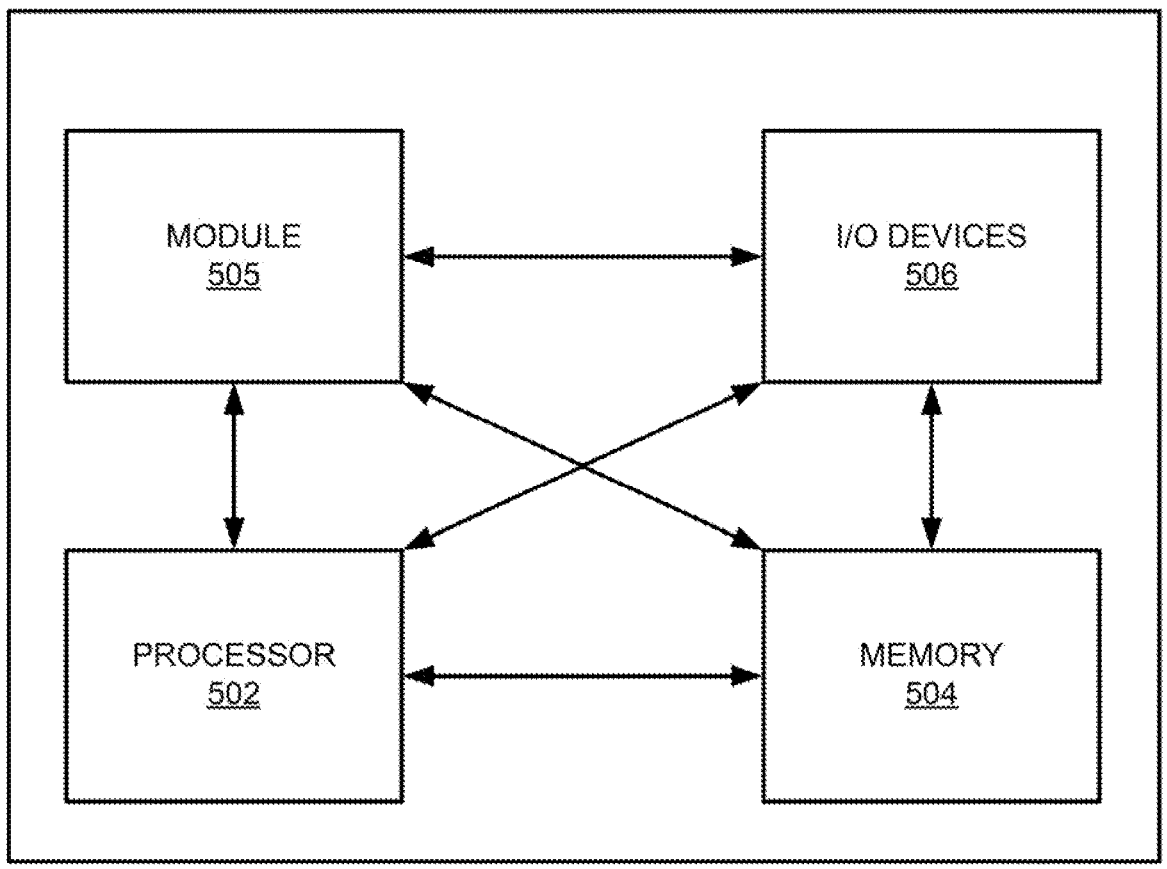
FIG. 5 depicts a high-level block diagram of a computing device or processing system specifically programmed to perform the functions described herein.

To this end, the DPIC 104 may comprise one or more physical devices, e.g., one or more computing systems or servers, such as computing system 500 depicted in FIG. 5, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

For instance, in one example, the DPIC 104 (e.g., a remote device or server) may obtain, from one of the user endpoint devices 108, 110, 112, or 114, a request for a dataset that is stored somewhere in the system 100 (e.g., in a data catalog and/or in the DB 106). In response to the request, the DPIC 104 may obtain and deliver the dataset to the user endpoint device 108, 110, 112, or 114 (subject to any security constraints which may have been imposed on the dataset) via a data pipeline 128. In one example, the data pipeline may comprise a plurality of interconnected components (or "nodes") that work together to deliver datasets, which may be obtained from one or more sources within the system 100, to one or more destinations within the system 100. For instance, the data pipeline 128 may include a plurality of endpoints (e.g., including user endpoint devices 108, 110, 112, and 114), a plurality of intermediate nodes between the plurality of endpoints, adapters, collectors, algorithms, search functions, data catalogs, portals, data stores, and other components that cooperate to deliver datasets to different users and/or communities on-demand.

In one example, the DPIC 104 may create new schemas to handle new source data retrievals and/or to integrate new data pipeline component types, and may assemble and tear down data pipelines in real-time. In one example, the DPIC 104 is flexibly expandable via add-ons, plug-ins, helper applications, and the like. When a user, such as a data scientist, a network operator, or the like seeks to obtain specified datasets from multiple sources (e.g., to provide to one or more machine learning models as target(s)), the user may provide the request by specifying the desired dataset and the desired target(s), and the DPIC 104 may automatically generate an end-to-end plan to obtain and transmit the right dataset from the right source(s) (e.g., data owners(s)) to the right target(s) (e.g., data user(s)). Thus, the present disclosure provides for intelligent control of data pipelines via the DPIC 104, which automatically integrates and directs data pipeline components at a higher level of abstraction.

Data pipelines may be constructed dynamically by the DPIC 104, and on an as-needed basis, such that even complex or demanding user requests may be fulfilled without (or with minimal) human interaction, and without component-specific human expertise regarding the various data pipeline components.

In many cases, a data pipeline (or its associated support functions) may be in existence, but the data pipeline itself may be inactive. In other cases, a data pipeline may not be physically or virtually established, but all of the associated support functions are available in the cloud. In response to a request for dataset retrieval, examples of the present disclosure may activate an inactive data pipeline or may form a new data pipeline in real-time. Examples of the present disclosure may further include features for security and access, authentication, and authorization (AAA). For instance, a requesting user may not have the right to access a dataset. In this case, the DPIC 104 of the present disclosure may obtain the access rights for protected dataset(s), accounting services, proxy creation, protocol setting, payment settlement, and so on.

Figure 2:
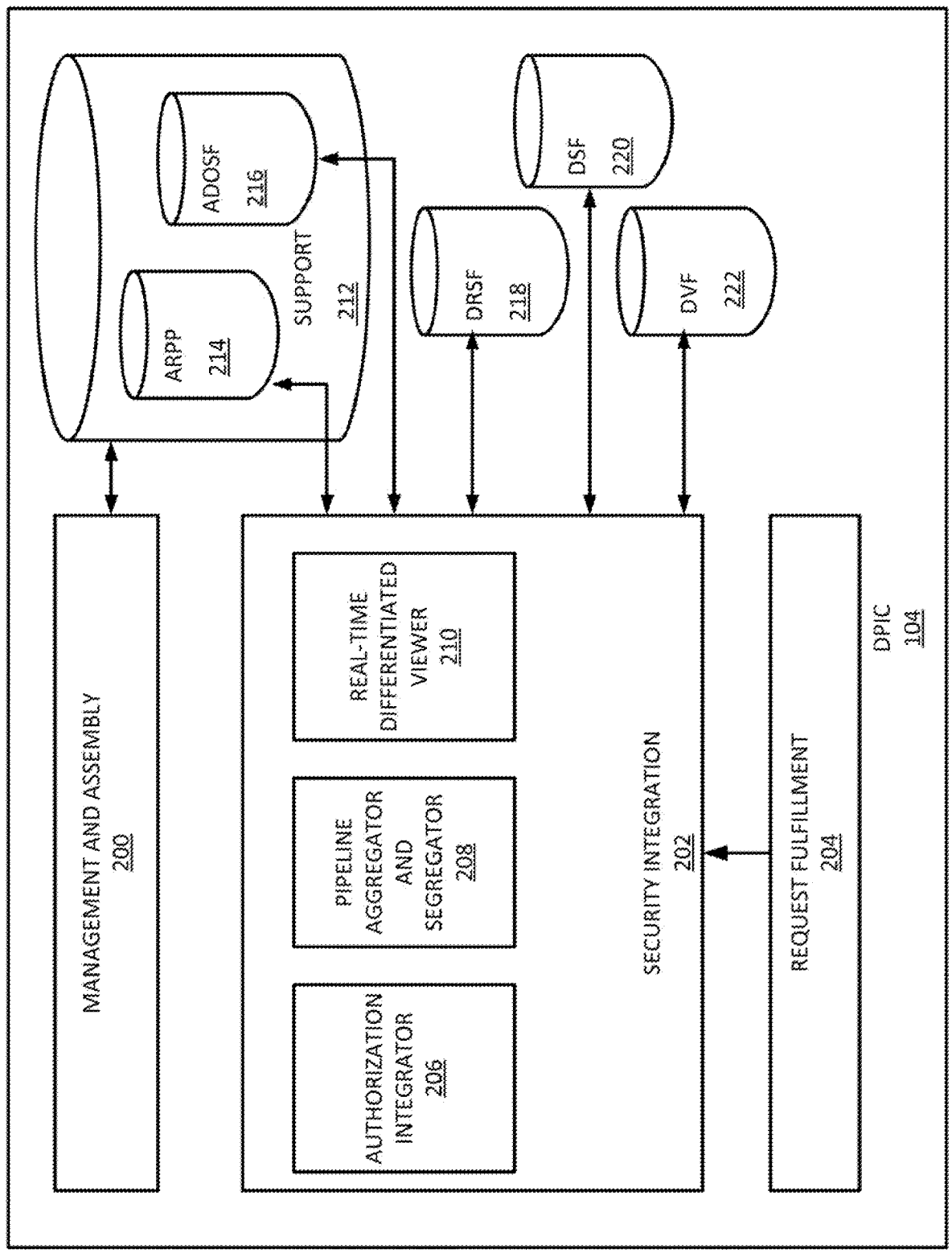
FIG. 2 illustrates one example of the data pipeline intelligent controller of FIG. 1 in greater detail.

FIG. 2 illustrates one example of the data pipeline intelligent controller (DPIC) 104 of FIG. 1 in greater detail. As illustrated, the DPIC 104 may include the following processing systems, each of which is described in greater detail below: a management and assembly module 200, a security integration module 202, and a request fulfillment module 204.

The management and assembly module 200 may receive triggers to dynamically create and/or adjust one or more information models (e.g., including ontologies, templates, and policies) that the DPIC 104 uses to create and manage data pipelines (including the data pipeline 128 of FIG. 1). The management and assembly module 200 may interpret ontologies and leverage machine learning techniques to generate a recommendation for improving the efficiency of the information models.

The request fulfillment module 204 may receive and analyze triggers for data requests and may tailor pipelines and data sources to satisfy the end-to-end delivery needs specified in the triggers. The request fulfillment module 204 may dynamically create, modify, and/or dismantle data pipelines based on policies and/or machine learning recommendations generated by the management and assembly module 200. In further examples, the request fulfillment module 204 may track metadata associated with data that is delivered via the pipelines in order to verify proper fulfillment of requests for data.

The security integration module 202 may comprise a plurality of sub-modules that may be invoked by the request fulfillment module 204 in order to ensure that any delivery of data via the data pipeline(s) respects any security protocols or restrictions that apply to the data. In one example, the security integration module 202 may comprise an authorization integrator 206, a pipeline aggregator and segregator 208, and real-time differentiated viewer 210.

The authorization integrator 206 may determine a data-level access authorization associated with a user who is requesting a dataset and may ensure that any policies related to the requested dataset are followed. The authorization integrator 206 may be invoked by the request fulfillment module 204 to analyze a requesting user's security profile. Thus, the authorization integrator 206 may determine: (1) whether the requesting user has the data-level access authorization necessary to access the requested dataset; (2) when the requesting user does not have the necessary data-level access authorization, what level of the aggregated view (of an integrated dataset) the requesting user is authorized to view; (3) under (1) or (2), what additional filters, if any, may need to be applied per each requesting user; and (4), under (1) and (2), what data manipulation polices, if any, may need to be taken into consideration (such as location sensitivity, etc.). The output of the authorization integrator's analysis is a dynamic per-request security filter (DRSF) to be stored in a DPIC support repository 212, which stores filters to be used by information models and process models (which may also be stored in the support repository 212).

In one example, the authorization integrator 206 may also play a role during the building of information models as invoked by the management & assembly module 200. The resulting information models may be stored in an ADOSF data store 216, discussed in further detail below.

Thus, the authorization integrator 206 may determine what data a requesting user is authorized to access. The authorization integrator 206 may hide all of the security access rights from the requesting user without requiring any user interactions. One advantage of the authorization integrator 206 is an improvement of the user experience, since all of the access details no longer present as a roadblock to accessing needed data. Another advantage is an improvement in user productivity, since a requesting user does not need to spend time navigating organizational politics in order to obtain authorization to access needed data. Another advantage is project cost reduction and shorter project duration thanks to data automation.

The pipeline aggregator and segregator 208 may analyze and identify similar data requests which may be aggregated into a super request candidate. This super request will help the request fulfillment module 204 to compose an integrated dataset from one or more data sources and to deliver the integrated dataset via a logical super data pipeline. Just as a freeway has many exit ramps, each super data pipeline may allow all or a subset of an integrated dataset to be delivered to targets (requesting users) in each intermediate node within the super data pipeline. Thus, the pipeline aggregator and segregator module 208 may first create an integrated dataset to be delivered via a super data pipeline. As an example, suppose that an integrated dataset needed to satisfy a super request is not already established (e.g., in a data warehouse or a datalake). To newly create the integrated dataset, the DPIC controller 104 may need access to a first system to retrieve a first plurality of data tables and then may need access to a second system to retrieve a second plurality of data tables. A join command may subsequently be needed to create the final integrated dataset. The pipeline aggregator and segregator 208 may subsequently allow segregation of some data load of the final integrated dataset in each intermediate node within the super data pipeline to satisfy some requestor users' needs.

Thus, the pipeline aggregator and segregator 208 may aggregate similar data requests into a super request. Fulfillment of the super request will result in the composition of a dataset from one or more data sources, which may be delivered as data superset via a logical super data pipeline. This approach may drastically reduce the occurrence of unnecessary and duplicated datasets traversing corporate communication networks. An additional benefit is the reduction in data synchronization needs to address duplicated datasets across the corporate communication networks.

The real-time differentiated viewer 210 may create dynamic viewer filter(s) (DVFs) for each requesting user during the dataset delivery time. The DVFs may be stored in a DVF data store 222, discussed in further detail below. A fulfillment executor in the request fulfillment module 204 may apply the appropriate DVF to ensure that no one besides the requesting user receives/views a subset of a common dataset.

Thus, the real-time differentiated viewer 210 may offer a plurality of advantages. For instance, the real-time differentiated viewer 210 may further enhance the efficiency of the pipeline aggregator and segregator 208 by offering viewing filters to provide multiple requesting users with different viewing rights to access the same dataset, without compromising the authorization rules. Moreover, the viewing filters can be embedded within each dataset or can be delivered and distributed to intermediate nodes within the data pipeline. This flexibility enables a viewing filter change without the need to redistribute the entire dataset.

Additionally, when a data superset is created (e.g., by the pipeline aggregator and segregator 208) and the delivery path is being executed, the entire history may be recorded so that subsequent similar requests may join the pipeline without having to be re-created. Further, if the targeted delivery location of a subsequent similar request already exists as one of the intermediate nodes within the segregated data pipeline, then as long as the segregated data pipeline is not expired, appropriate filters may push to the intermediate nodes to provide instant delivery. This may drastically reduce the fulfillment time for the subsequent similar request.

Although the security integrator (including the authorization integrator 206, the pipeline aggregator and segregator 208, and the real-time differentiated viewer 210) is illustrated as residing in and being managed by the DPIC 104, in other examples, the authorization integrator 206, the pipeline aggregator and segregator 208, and/or the real-time differentiated viewer 210 can be configured externally to the DPIC 104 and interact with the DPIC 104 via a high speed data bus (e.g., offered as a service to support the DPIC 104). Moreover, any two or more of the authorization integrator 206, the pipeline aggregator and segregator 208, and the real-time differentiated viewer 210 may, in some examples, be implemented as a combined module or device.

As discussed above, the DPIC 104 may further include a plurality of data sources. This plurality of data sources may include a support repository 212, which may store information models and process models and may further include an ARPP data store 214 and an ADOSF data store 216. The data sources may also include a DRSF data store 218, a DSF data store 220, and the DVF data store 222.

The ARPP data store 214 may function as a proxy to obtain all requesting users' profile information, where the profile information can be used to provide data to supplement the creation of DRSFs in runtime. An ARPP stored in the ARPP data store 214 may be able to tap into existing profile information for requesting users from other enterprise-wide sources to avoid duplicated effort. Information in an ARPP may include attributes such as the requesting user's organization, requesting user's project domains, requesting user's research domains, requesting user's recent activity summary, and the like.

The ADOSF data store 216 may contain rulesets specified by owners of the data contained in the datasets. These rulesets may provide guidance and restrictions specifying how, when, and where each dataset can be retrieved, manipulated, and delivered to satisfy a data request. Restrictions specified by an ADOSF may include location restrictions (e.g., data attributes can only be operated in specific data centers/regions), attribute level authorization (e.g., which data attribute(s) can be delivered in the final dataset and which data attribute(s) can be used as interim data to generate the final dataset, which data attribute(s) are absolutely encrypted), and other restrictions.

The DRSF data store 218 may store DRSFs which may be created dynamically by the authorization integrator 206 during runtime. A DRSF may be used by the request fulfillment module 204, together with corresponding information models process models, to determine what authorized data tables, attributes, joins, and projections a requesting user may be authorized to receive. A DRSF may also be used as an interim key to link other associated tables, entities, and attributes to create a combined dataset. A DRSF deviates from traditional authorization methods in that a DRSF may be used to block access to a dataset when the requesting user does not have the credentials necessary to access a subset of the data stores/systems which host the requested dataset. However, as long as the requesting user has the authorization to access the requested dataset, the DRSF provides the means to accomplish the data retrieval task. As noted above, a DRSF may be dynamically created. After a request is fulfilled, some persistent filter rules from the DRSF may be migrated to profile stores accessible by the ARPP data store 214.

The DSF data store 220 may store DSFs which may be created dynamically by the pipeline aggregator and segregator module 208 after a composed super request is created. A DSF may function as a roadmap used by the fulfillment executor in the request fulfillment module 204 to determine the rules in which an intermediate node or an edge node the aggregated pipeline needs to be diverted from a super dataset and offloaded to be delivered to the targeted requesting user(s). The information in a DSF may include attributes that the initial request for a requesting user was requested, blocked attributes in the original request with a detailed explanation as to why the attributes were blocked, and enriched attributes which are not in the original request but which the DPIC 104 determines may offer new insights to the requesting user.

The DVF data store 222 may store DVFs which may be dynamically created by the real-time differentiated viewer module 210 on a per-data request basis. A DVF may provide detailed filtering specifications to allow the requesting user to only either receive or view a subset of a requested dataset. The DVF may enable different requesting users to obtain access to a common dataset at each intermediate node or edge node within the data pipeline. After delivery of a requested dataset, the DVF may be encoded into the dataset so that even if the requesting user obtains a local copy of the requested dataset, all appropriate filter(s) will still be in effect.

Thus, DRSFs, DSFs, and DVFs are dynamic, because DRSFs, DSFs, and DVFs are created on a per-request basis. By contrast, the ADOSF and ARPP are more static in nature, since the ADOSF and ARPP are initially pre-built during the assembly time and only be updated on an as-needed basis.

In one example, any of the above-discussed filters may include an adjustor feature. In general, a filter will provide exactly what a requesting user is asking for. But as long as the security profile allows, the requesting user may have the option to fine tune the filter via the adjustor feature. This may allow the requesting user to see what other requesting users were asking in a narrower view or in an expanded view. Thus, the adjustor feature may allow data scientists to analyze other peers' requests and to learn how to improve and leverage their peers' models and new understanding of how data can be correlated and used.

For example, suppose that Steve is the director in a first data management group, and that Arun and Sanjay report to Steve. Michelle is a member of a second data management group and does not know anyone in the first data management group.

Michelle may ask for a dataset. Sanjay and Arun may each also ask for a dataset. All data requests may be made within a predetermined window of time (e.g., within x minutes), and, because the active profiles show a strong correlation among Michelle, Sanjay, and Arun, the authorization integrator 206 may decide to create a data superset to fulfill the three requests for datasets.

Within the three requests for datasets, Arun may ask for a more comprehensive dataset. Sanjay may ask for a subset of that dataset that Arun asked for. Michelle may ask for a small dataset. However, Michelle may further ask that a first dataset containing mobile device subscriber information be joined to a second dataset containing Internet Protocol television (IPTV) service subscriber information in order to determine how many mobile device subscribers are watching the same IPTV program at the same time. Neither Sanjay nor Arun may have considered such a correlation between the first and second datasets.

A dynamic adjustable filter may be formed and distributed to the end point and/or intermediate node(s) of the data pipeline. The dynamic adjustable filter may enable a requesting user to see minimal information initially, based on the requesting user's initial request for data. But if Arun and Sanjay have extra time, Arun and Sanjay may dynamically adjust the filters associated with their initial data requests to gradually view more information (which they may not have initially asked for, but which may be interesting and/or relevant to them). So Arun and Sanjay may be able to see part of the data that Michelle asked for, as long as Arun and Sanjay have the security credentials to see that data.

After a few adjustments to the filter, however, Arun and Sanjay may eventually encounter a roadblock, because Arun's and Sanjay's global profiles may present some fundamental constraints. For instance, Michelle may be able to see all IPTV data, but Sanjay and Arun may only be able to see mobile device data and general IPTV feature sets only, not including real time streaming information. Although Sanjay and Arun cannot view the real time streaming information, Arun and Sanjay can certainly view the structure of Michelle's data request, and Arun and Sanjay may be able to view the attribute list of Michelle's data request with fake values populated. This ability may prompt Sanjay and Arun to talk to Steve, who may recognize the power of the link between the mobile device and IPTV data and may ask a global profile team to extend Steve's data access rights.

From this point onward, everyone in the first data management group may be able to see, via the dynamic adjustable filter, everything that Michelle requests. Thus, even though Sanjay and Arun may not have extra time to request a combined dataset, Arun and Sanjay can take advantage of the ability to learn new insights whenever Michelle requests data, even though Arun and Sanjay may not have actually met or talked to Michelle.

Michelle, meanwhile, may indirectly be aware of the fact that her requests for data are always bundled with the first data management group, and this knowledge may prompt Michelle to eventually collaborate with the first data management group (who she may not have known prior to her requests being bundled). In addition, when consistent with Michelle's access rights, Michelle may view Sanjay's and Arun's data requests to determine whether additional mobility attributes may be of interest.

In some examples, this adjustor feature may be disabled due to the added complication in verifying authorizations. The adjustor feature may not necessarily optimize based on what other users are requesting, but may optimize for the reuse of similar datasets across different groups of users who need similar pipelines to address respective project-specific requirements. For instance, two groups of users within the same organization may be addressing two different but related datasets to solve for reduction of bad volumes for which each group needs to solve. In this case, one group's work may inform the other group, or a combined approach may provide greater synergy and lower costs.

In one example, the authorization integrator 206, the pipeline aggregator and segregator 208, and the real-time differentiated viewer 210 may operate independently of each other when interacting with subsystems of the DPIC 104. These subsystem interactions are discussed in further detail below.

In another example, the authorization integrator 206 may work with the management and assembly module 200 during the design stage to create the ARPP and ADOSFs before runtime execution begins.

In another example, the authorization integrator 206, the pipeline aggregator and segregator 208, and the real-time differentiated viewer 210 may operate together to support data pipeline delivery. In this example, the authorization integrator 206 may first analyze appropriate authorization profiles for all data requests in real-time. The output of the authorization integrator 206 may be a list of security filters stored in the DRSF data store 218. The list of security filters will enable the DPIC 104 to determine how to get requested data for each requesting user, even though the requesting users may have not been granted with direct access rights to the requested data (but the requesting users may still have the right to get the requested data).

Next, the pipeline aggregator and segregator 208 may create a superset pipeline specification(s) to enable the DPIC 104 to aggregate similar data requests into a super pipeline. The pipeline aggregator and segregator 208 may also create segregation filters which enable the DPIC 104 to split a superset dataset into a segregated pipeline to deliver the dataset to intermediate nodes in the pipeline. The dataset that is delivered to each intermediate node may be supported by other aggregation filters, so that local joins or projections of data can continue to be performed before delivery of a dataset to a target (requesting user).

The real-time differentiated viewer 210 may provide the final set of filters to assist the DPIC 104 in enforcing the last line of security. The real-time differentiated viewer 210 may develop DVFs which are embedded in the delivered dataset. The DVFs may function to allow only an authorized portion of each dataset to be viewed or used by a given requesting user.

As illustrated in FIG. 1, the DPIC 104 may have access to at least one database (DB) 106, where the DB 106 may comprise one or more data catalogs which store information related to datasets that users of the system 100 have made available for sharing. The datasets may be physically stored across a plurality of different systems within the system 100, but the data catalogs may contain information about which systems store which datasets, as well as any security settings or policies that may be relevant to the datasets.

In one example, the DB(s) 106 and/or the DPIC 104 may belong to and may be accessible exclusively to a single enterprise. For instance, an enterprise may deploy the DPIC 104 and DB(s) 106 in order to facilitate the sharing of data among the enterprise's employees, resulting in greater employee productivity and cooperation. However, the DPIC 104 and associated infrastructure are not limited to deployment within a corporate network. For instance, the DPIC 104 and associated infrastructure may be extended to the cloud (public, private, and/or partner). The DPIC 104 may, in fact, be securely configured within a corporate private cloud. The DPIC 104 may also be deployed as part of a service offered by a service provider via the cloud. In this case, the service provider may ensure privacy and delivery function to the service provider's customers. Thus, there may be multiple instances of DPICs 104 which may communicate with each other in order to determine which filters need to be set with which policies.

In one example, the DB(s) 106 may comprise a physical storage device integrated with the DPIC 104 (e.g., a database server or a file server), or attached or coupled to the DPIC 104, in accordance with the present disclosure. In one example, the DPIC 104 may load instructions into a memory, or one or more distributed memory units, and execute the instructions for using incentives to encourage the sharing of datasets, as described herein. Example methods for delivering datasets in a secure manner are described in greater detail below in connection with FIGS. 3-4.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Thus, the authorization integrator 206 of the security integration module 202 allows a requesting user to avoid unnecessary processes and to be able to obtain the data to which the requesting user is permitted access when needed. This stands in contrast to conventional data access schemes which are based on individual authorization on a per-data repository or per-system basis (in which case the requesting user might have to cut through significant red tape just to gain access to a particular data table).

The pipeline aggregator and segregator 208 of the security integration module 202 enables the creation of a composed data pipeline and allows a subset of a dataset to be delivered to the requesting user at different end points. This stands in contrast to conventional handling of data access requests, which are typically handled on an individual basis (potentially causing unnecessary data movement within the enterprise which may increase operational cost and introduce unnecessary traffic volume).

The real-time differentiated viewer 210 of the security integration module 202 allows authorization filters to be embedded into a dataset so that, on a per-requester basis, the requesting user will see/receive somewhat different views against the same dataset delivered by the same pipeline. This stands in contrast to conventional data deliver approaches in which, when the same dataset is requested by multiple requestors with various authorization profiles, multiple individual datasets are replicated and delivered to the individual requestors separately (even though the requestors may be co-located at the same end point).

In addition, the system 100, and the security integration module 202 in particular, supports the concept of a dynamic adjustable filter. Conventional solutions enable some type of security filter for a request to be implemented. The disclosed approach, however, focuses on security but emphasizes and encourages collaboration wherever possible. For instance, a requesting user may receive a minimal dataset per initial request. The requesting user can view similar but non-identical requests to learn how other requesting users are using the dataset. This drastically improves the collaboration and learning within every data request.

Figure 3:
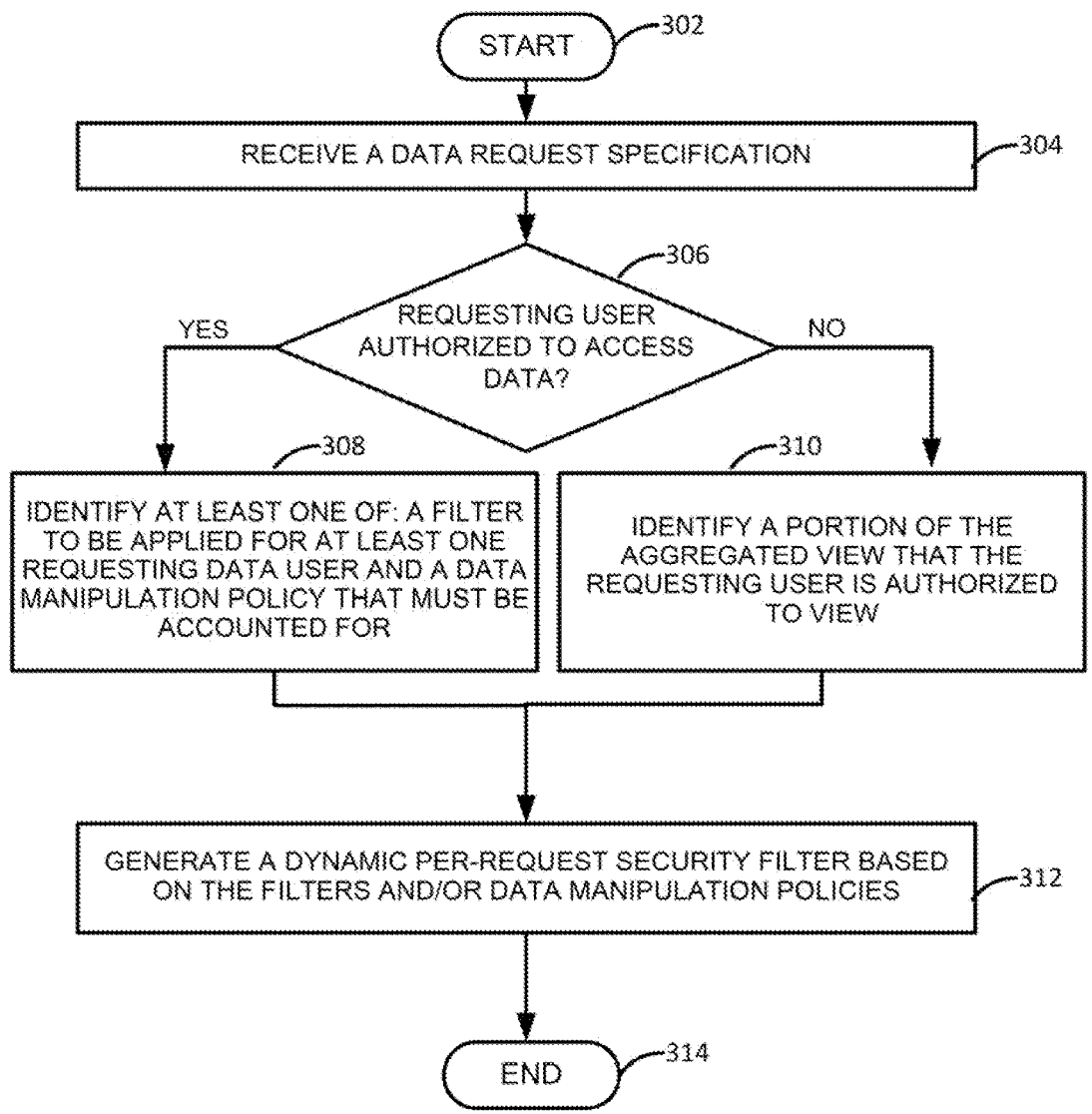
FIG. 3 illustrates a flowchart of an example method for securely delivering an integrated dataset via a data pipeline, in accordance with the present disclosure.

FIG. 3 illustrates a flowchart of an example method 300 for securely delivering an integrated dataset via a data pipeline, in accordance with the present disclosure. For instance, steps, functions and/or operations of the method 300 may be performed by a device as illustrated in FIG. 1, e.g., DPIC 104 or any one or more components thereof. For instance, in one example, the method 300 is performed by the authorization integrator 206. In another example, the steps, functions, or operations of method 300 may be performed by a computing device or system 500, and/or a processing system 502 as described in connection with FIG. 5 below. For instance, the computing device 500 may represent at least a portion of the DPIC 104 in accordance with the present disclosure. For illustrative purposes, the method 300 is described in greater detail below in connection with an example performed by a processing system, such as processing system 502.

As discussed above, the method 300 comprises a method for securely delivering an integrated dataset (i.e., a dataset containing data from two or more different source systems) via a data pipeline. More specifically, the method 300 creates an integrated dataset to deliver to a requesting user who does not have individual access rights to some of the source systems from which the data in the dataset must be retrieved. In one example, the method 300 assumes that an integrated dataset is not established in the data warehouse or a datalake. If an integrated dataset were to be created, access to multiple (i.e., two or more) source systems would be needed in order to retrieve multiple different data tables. A join command would then need to be applied to create the final integrated dataset. A requesting user (such as an application or a data scientist) may need an integrated dataset of this type to perform model training; however, the requesting user may not have the knowledge of some of the source systems from which the different data tables need to be retrieved (e.g., possibly due to lack of system-level access). Moreover, since the integrated dataset does not exist anywhere, the integrated dataset would not have an entry in the data catalog.

The method 300 begins in step 302 and proceeds to step 304. In step 304, the processing system may receive a data request specification. In one example, the data request specification may be generated by a requesting user who has populated the fields of a pre-defined template with the details of a data request (e.g., a request for an integrated dataset). The populated template may output the data request specification as a data structure that can be analyzed and interpreted by the processing system. In one example, a data request interpreter in the request fulfillment module 204 of FIG. 2 may interpret the data request specification and match an appropriate information model to the data request specification, where the process flow(s) of the information model may be used to fulfill the request.

In step 306, the processing system may determine whether the requesting user is authorized (i.e., has the data-level access authorization) to access the data requested in the data request specification. In one example, the processing system may analyze a security profile of the requesting user, which may be provided within the data request specification. The security profile may also be retrieved from the ARPP data store 214 of FIG. 2. The security profile may indicate the data-level access authorizations associated with the requesting user.

If the processing system determines in step 306 that the requesting user is authorized to access the data requested in the data request specification, then the method 300 may proceed to step 308. In optional step 308, the processing system may identify at least one of: a filter to be applied for at least one requesting data user and a data manipulation policy that must be accounted for (e.g., location sensitivity or the like). In one example, any filters and/or data manipulation policies that are to be applied for a given requesting user may be specified in the requesting user's security profile (included as part of the data request specification or retrieved from the ARPP data store 214). The filters may include, for instance, DVFs and DRSFs.

If, on the other hand, the processing system determines in step 306 that the requesting user is not authorized to access the data requested in the data request specification, then the method 300 may proceed to step 310. In step 310, the processing system may identify a portion of the dataset that the requesting user is authorized to view. The portion of the dataset that the requesting user is authorized to view may be determined based on the requesting user's security profile, as discussed above.

In step 312, the processing system may generate a dynamic per-request security filter (DRSF) based on the filters and/or data manipulation policies identified in steps 308-310. The DRSF may be stored in support repository 212 of FIG. 2 for use by the information model(s) and corresponding process model(s) identified in step 302. The DRSF may also be used by the request fulfillment module 204 of FIG. 2 to initiate a negotiation process among the systems and/or data repositories storing the requested data, with a goal to bypass any unnecessary authorizations to create a final integrated (e.g., joined/projected) dataset.

The method 300 may end in step 314. Conventional data pipeline processing may continue from step 314 in order to deliver the requested dataset (subject to any access limits) to the requesting user.

Figure 4:
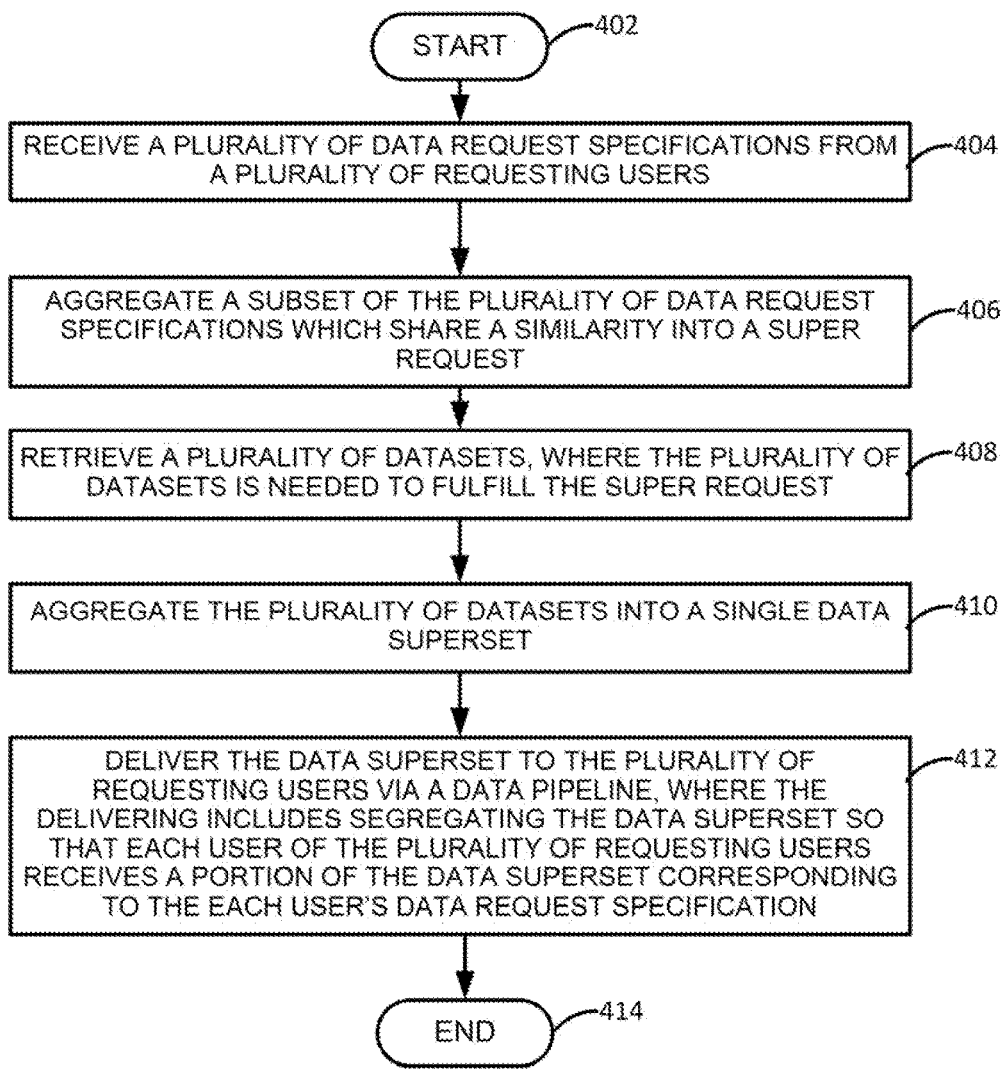
FIG. 4 illustrates a flowchart of an example method for securely delivering an integrated dataset via a data pipeline, in accordance with the present disclosure.

FIG. 4 illustrates a flowchart of an example method 400 for securely delivering an integrated dataset via a data pipeline, in accordance with the present disclosure. For instance, steps, functions and/or operations of the method 400 may be performed by a device as illustrated in FIG. 1, e.g., DPIC 104 or any one or more components thereof. For instance, in one example, the method 400 is performed by the pipeline aggregator and segregator 208. In another example, the steps, functions, or operations of method 400 may be performed by a computing device or system 500, and/or a processing system 502 as described in connection with FIG. 5 below. For instance, the computing device 500 may represent at least a portion of the DPIC 104 in accordance with the present disclosure. For illustrative purposes, the method 400 is described in greater detail below in connection with an example performed by a processing system, such as processing system 502.

As discussed above, the method 400 comprises a method for securely delivering an integrated dataset (i.e., a dataset containing data from two or more different source systems) via a data pipeline to a plurality of different requesting users. More specifically, the method 400 creates an integrated dataset which may be split into a plurality of different parts, where each part is deliver to a different requesting user (e.g., at intermediate and/or edge nodes within the pipeline).

The method 400 begins in step 402 and proceeds to step 404. In step 404, the processing system may receive a plurality of data request specifications from a plurality of endpoint devices of requesting users. As discussed above, each data request specification may be generated by a respective requesting user (of the plurality of requesting users) who has populated the fields of a pre-defined template with the details of a data request. The populated template may output the data request specification as a data structure that can be analyzed and interpreted by the processing system.

In step 406, the processing system may aggregate a subset of the plurality of data request specifications which share a similarity into a super request (e.g., using rulesets defined by the system 100). In one example, a validation/assurance subsystem in the request fulfillment module 204 of FIG. 2 may invoke the aggregation function in the pipeline aggregator and segregator 208. The similarity may be identified, for example, by matching keywords in the subset of the plurality of data request specifications (where the keywords may comprise the same word that matches exactly and/or may comprise synonyms for each other). For instance, two or more data request specifications, although not identical, may both seek access to the same dataset; thus, there may be some overlap in terms of the datasets that are sought by two or more different data request specifications (e.g., the two or more data request specifications may seek access to at least one common dataset).

The super request may comprise a data request that includes any requests which are redundant in the plurality of data request specifications once. For instance, if a first data request specification includes a request for datasets A and B, and a second data request specification includes a request for datasets B and C, then a super request that aggregates the first and second data request specifications may request datasets A, B, and C (i.e., normalizing for dataset B requirements).

In step 408, the processing system may retrieve a plurality of datasets, where the plurality of datasets is needed to fulfill the super request. For instance, the validation/assurance subsystem of the request fulfillment module 204 may search a plurality of data catalogs that store datasets made available by the dataset owners for sharing.

In step 410, the processing system may aggregate the plurality of datasets into a single data superset, i.e., a single dataset that includes all of the content of the plurality of datasets (or all of the datasets needed to fulfill the subset of the data request specifications). For instance, continuing the above example, the data superset may include datasets A, B, and C.

In step 412, the processing system may deliver the data superset to the plurality of user endpoint devices of the requesting users via a data pipeline, where the delivering includes segregating the data superset so that each user of the plurality of requesting users receives a portion of the data superset corresponding to each user's data request specification. For instance, continuing the example above, the requesting user who submitted the first data request specification may receive datasets A and B, while the requesting user who submitted the second data request specification may receive datasets B and C. In one example, the processing system may implement one or more segregation filters retrieved from the DRSF data store 218 at the intermediate nodes along the pipeline in order to determine which requesting users are to receive which portions of the data superset.

The method 400 may end in step 414.

It should be noted that the methods 300 and 400 may be expanded to include additional steps or may be modified to include additional operations with respect to the steps outlined above. In addition, although not specifically specified, one or more steps, functions, or operations of the methods 300 and 400 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 of FIG. 4 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for securely delivering datasets using a data pipeline, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 or 400 as discussed above are implemented in a distributed or parallel manner for a particular illustrative example, i.e., the steps of the above method 300 or 400 or the entire method 300 or 400 are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300 or 400. In one example, instructions and data for the present module or process 505 for securely delivering datasets using a data pipeline (e.g., a software program comprising computer-executable instructions) can be loaded into memory 504 and executed by hardware processor element 502 to implement the steps, functions, or operations as discussed above in connection with the illustrative method 300 or 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for securely delivering datasets using a data pipeline (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:
1. A method comprising:
    receiving, by a processing system including at least one processor, a plurality of data request specifications from a plurality of user endpoint devices of requesting users;

aggregating, by the processing system, a subset of the plurality of data request specifications which share a similarity into a super request;

retrieving, by the processing system, a plurality of datasets, wherein the plurality of datasets is needed to fulfill the super request;

aggregating, by the processing system, the plurality of datasets into a single data superset; and delivering, by the processing system, the single data superset to the plurality of user endpoint devices of the requesting users via a data pipeline, where the delivering includes segregating the single data superset so that each user endpoint device of the plurality of user endpoint devices of the requesting users receives a portion of the single data superset corresponding to one data request specification of the plurality of data request specifications that was submitted by the each user endpoint device.

2. The method of claim 1, wherein each data request specification of the plurality of data request specifications is generated by a respective user of the plurality of requesting users populating fields of a predefined template with details of a request for data.

3. The method of claim 1, wherein the aggregating the subset of the plurality of data request specifications comprises identifying a keyword that is contained in each data request specification in the subset.

4. The method of claim 1, wherein the subset of the plurality of data request specifications comprises data requests that are non-identical but that seek access to at least one common dataset.

5. The method of claim 1, wherein the plurality of datasets comprises all datasets needed to fulfill all data request specifications in the subset.

6. The method of claim 1, wherein the delivering comprises implementing a segregation filter at an intermediate node along the data pipeline in order to determine which portions of the single data superset a given user endpoint device of the plurality of user endpoint devices of the requesting users is to receive.

7. The method of claim 6, wherein the segregation filter is stored in a data store accessible to the processing system.

8. The method of claim 1, wherein the retrieving comprises dynamically creating a security filter for at least one data request specification of the plurality of data request specifications, wherein the security filter defines an authorization of at least one user of the plurality of requesting users to access data contained in the plurality of datasets.

9. The method of claim 8, wherein the security filter is dynamically created using information defined in a profile for the at least one user, wherein the profile defines, for the at least one user, at least one selected from a group of: an organization of the at least one user, a project domain of the at least one user, a research domain of the at least one user, and a summary of recent activity of the at least one user.

10. The method of claim 1, wherein the retrieving comprises retrieving a security filter associated with at least one dataset of the plurality of datasets, wherein the security filter includes a ruleset defined by an owner of the at least one dataset.

11. The method of claim 10, wherein the ruleset defines a location-based restriction on usage of data contained in the at least one dataset.

12. The method of claim 10, wherein the ruleset defines a restriction on which data attributes contained in the at least one dataset are allowed to be included in the data superset.

13. The method of claim 1, wherein the delivering comprises applying at least one filter to restrict how much of the single data superset at least one user endpoint device of the plurality of user endpoint devices of the requesting users is able to receive.

14. The method of claim 13, wherein the applying the at least one filter comprises encoding the at least one filter into the single data superset.

15. The method of claim 13, wherein the at least one filter is dynamically created in response to the plurality of data request specifications.

16. The method of claim 1, wherein the data pipeline comprises a plurality of endpoints and a plurality of intermediate nodes between the plurality of endpoints.

17. The method of claim 1, wherein the data pipeline further comprises at least one selected from a group of: an adapter, a collector, an algorithm, a search function, a data catalog, a portal, and a data store.

18. The method of claim 1, wherein the processing system is part of a controller that controls an operation of the data pipeline.

19. A non-transitory computer-readable medium storing instructions which, when executed by a processing system including at least one processor, cause the processing system to perform operations, the operations comprising:

receiving a plurality of data request specifications from a plurality of user endpoint devices of requesting users;

aggregating a subset of the plurality of data request specifications which share a similarity into a super request;

retrieving a plurality of datasets, wherein the plurality of datasets is needed to fulfill the super request;

aggregating the plurality of datasets into a single data superset; and delivering the single data superset to the plurality of user endpoint devices of the requesting users via a data pipeline, where the delivering includes segregating the single data superset so that each user endpoint device of the plurality of user endpoint devices of the requesting users receives a portion of the single data superset corresponding to one data request specification of the plurality of data request specifications that was submitted by the each user endpoint device.

20. A device comprising:

a processing system including at least one processor; and a non-transitory computer-readable medium storing instructions which, when executed by the processing system, cause the processing system to perform operations, the operations comprising:

receiving a plurality of data request specifications from a plurality of user endpoint devices of requesting users;

aggregating a subset of the plurality of data request specifications which share a similarity into a super request;

retrieving a plurality of datasets, wherein the plurality of datasets is needed to fulfill the super request;

aggregating the plurality of datasets into a single data superset; and delivering the single data superset to the plurality of user endpoint devices of the requesting users via a data pipeline, where the delivering includes segregating the single data superset so that each user endpoint device of the plurality of user endpoint devices of the requesting users receives a portion of the single data superset corresponding to one data request specification of the plurality of data request specifications that was submitted by the each user endpoint device.

\* \* \* \* \*